United States Patent
Lee

(10) Patent No.: US 8,941,263 B2
(45) Date of Patent: Jan. 27, 2015

(54) ENERGY STORAGE SYSTEM AND METHOD OF CONTROLLING THE SAME

(75) Inventor: Sung-Im Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 921 days.

(21) Appl. No.: 13/005,112

(22) Filed: Jan. 12, 2011

(65) Prior Publication Data

US 2011/0291479 A1     Dec. 1, 2011

(30) Foreign Application Priority Data

Jun. 1, 2010  (KR) .................. 10-2010-0051960

(51) Int. Cl.
  *H02J 1/10*  (2006.01)
  *H02J 3/32*  (2006.01)
(52) U.S. Cl.
  CPC ...................................... *H02J 3/32* (2013.01)
  USPC .................. 307/43; 307/46; 307/77; 307/72; 307/66; 307/140
(58) Field of Classification Search
  CPC ........................................................ H02J 1/00
  USPC ........................................................... 307/43
  See application file for complete search history.

(56) References Cited

U.S. PATENT DOCUMENTS

| | | | |
|---|---|---|---|
| 7,117,044 B2* | 10/2006 | Kocher et al. | 700/34 |
| 7,880,334 B2* | 2/2011 | Evans et al. | 307/66 |
| 8,106,535 B2* | 1/2012 | Nishimura | 307/80 |
| 2003/0047209 A1 | 3/2003 | Yanai et al. | |
| 2008/0203816 A1* | 8/2008 | Fujita | 307/48 |
| 2008/0278119 A1* | 11/2008 | Veselic | 320/161 |
| 2009/0295330 A1* | 12/2009 | Li et al. | 320/124 |
| 2010/0017045 A1* | 1/2010 | Nesler et al. | 700/296 |
| 2010/0213763 A1* | 8/2010 | Boss et al. | 307/29 |

FOREIGN PATENT DOCUMENTS

| | | |
|---|---|---|
| JP | 11-127546 A | 5/1999 |
| JP | 2003-348768 A | 12/2003 |
| JP | 2004-180467 A | 6/2004 |
| JP | 3759151 B1 | 1/2006 |
| JP | 2006-149037 A | 6/2006 |
| JP | 2007-295680 A | 11/2007 |
| JP | 2008-118805 A | 5/2008 |
| JP | 2008-236897 A | 10/2008 |

(Continued)

OTHER PUBLICATIONS

Korean Office Action dated Jun. 23, 2011 from Korean Patent Application No. KR 10-2010-0051960 which corresponds to captioned U.S. Appl. No. 13/005,112.

(Continued)

*Primary Examiner* — Jared Fureman
*Assistant Examiner* — Toan Vu
(74) *Attorney, Agent, or Firm* — Knobbe, Martens, Olson & Bear, LLP

(57) ABSTRACT

An energy storage system and a method of controlling the energy storage system are disclosed. The energy storage system includes an integrated controller configured to determine a functional state of a power converting unit, a bidirectional converter, and a bidirectional inverter based on conditions of the power generation system, the battery, and the load.

15 Claims, 9 Drawing Sheets

(56) References Cited

FOREIGN PATENT DOCUMENTS

| JP | 2009-159730 A | 7/2009 |
| KR | 10-2004-0055061 A | 6/2004 |
| KR | 10-0817137 B1 | 3/2008 |
| WO | WO 2009/155445 A2 | 12/2009 |

OTHER PUBLICATIONS

Japanese Office Action dated Nov. 20, 2012 for Japanese Patent Application No. JP 2011-104470 which shares priority of Korean Patent Application No. KR 10-2010-0051960 with captioned U.S. Appl. No. 13/005,112.

Extended European Search Report dated Oct. 27, 2014 for European Patent Application No. EP 11 161 919.3 which shares priority of Korean Patent Application No. KR 10-2010-0051960 with captioned U.S. Appl. No. 13/005,112, and cites the above-identified references numbered 1-6.

* cited by examiner

US 8,941,263 B2

ENERGY STORAGE SYSTEM AND METHOD OF CONTROLLING THE SAME

CROSS-REFERENCE TO RELATED APPLICATIONS

This application claims the benefit of Korean Patent Application No. 10-2010-0051960, filed on Jun. 1, 2010, in the Korean Intellectual Property Office, the disclosures of which are incorporated herein in their entirety by reference.

BACKGROUND

1. Field

The disclosed technology relates to energy storage systems and methods of controlling the same.

2. Description of the Related Technology

Due to problems including environment destruction and natural resource depletion, there are rising interests in systems for storing energy and efficiently utilizing the stored energy. Furthermore, there are rising interests in generating power by using renewable sources in a manner that does not produce pollution. An energy storage system is a system for interconnecting such a renewable power generator, a battery, and a conventional grid. To further advancement in this area, research is being performed and developments have been made in response to recent environmental changes.

Electric power systems, such as power companies, produce power from various resources which have varying degrees of reliability. For instance, renewable energy resources are naturally replenished but flow-limited. They are virtually inexhaustible in duration but limited in the amount of energy that is available per unit time.

Furthermore, to supply electric power to consumers, the power generators must distribute their energy to a power grid. An electric power grid is a system of synchronized power providers and consumers connected by transmission and distribution lines and operated by one or more control centers. Thus, the reliability of adequate power for distribution depends on both the availability generated and the proper flow through the grid.

A breakdown in either power provider or grid can cause a complete or partial power outage. In addition, there may be a transition period, sometimes called a quasi-normal state, that occurs between such abnormal and normal states of power distribution. In these instances of disruption, a battery back up for the load i.e. a device that uses electric power, on the consumer side may be used to maintain effective reliability to the electric power user.

SUMMARY OF CERTAIN INVENTIVE ASPECTS

One inventive aspect is a method of controlling an energy storage system connected to a power generation system, a battery, a grid, and a load. The method includes determining whether the grid is connected to the load, and determining whether power is generated by the power generation system. The energy storage system operates in one of a plurality of modes, based on at least one of an amount of power generated by the power generation system, a charge state of the battery, an amount of power needed to charge the battery, an amount of power discharged from the battery, an amount of power to be consumed by the load, a current time, whether the grid is connected to the load, and whether power is generated by the power generation system.

Another inventive aspect is an energy storage system connected to a power generation system, a battery, a grid, and a load. The energy storage system includes a power converting unit configured to convert voltage output from the power generation system to a DC link voltage, and a bidirectional convertor configured to operate in one of a first discharging mode for converting power output from a battery voltage to the DC link voltage and a first charging mode for converting the DC link voltage to a charging voltage of the battery. The system also includes a bidirectional inverter configured to operate in one of a second discharging mode for converting the DC link voltage to alternated current (AC) voltage for the grid and a second charging mode for converting the AC voltage of the grid to the DC link voltage, and an integrated controller configured to determine functionality of the power converting unit, the bidirectional converter, and the bidirectional inverter based on states of the power generation system, the battery, and the load.

DETAILED DESCRIPTION OF CERTAIN INVENTIVE EMBODIMENTS

Figure 1:
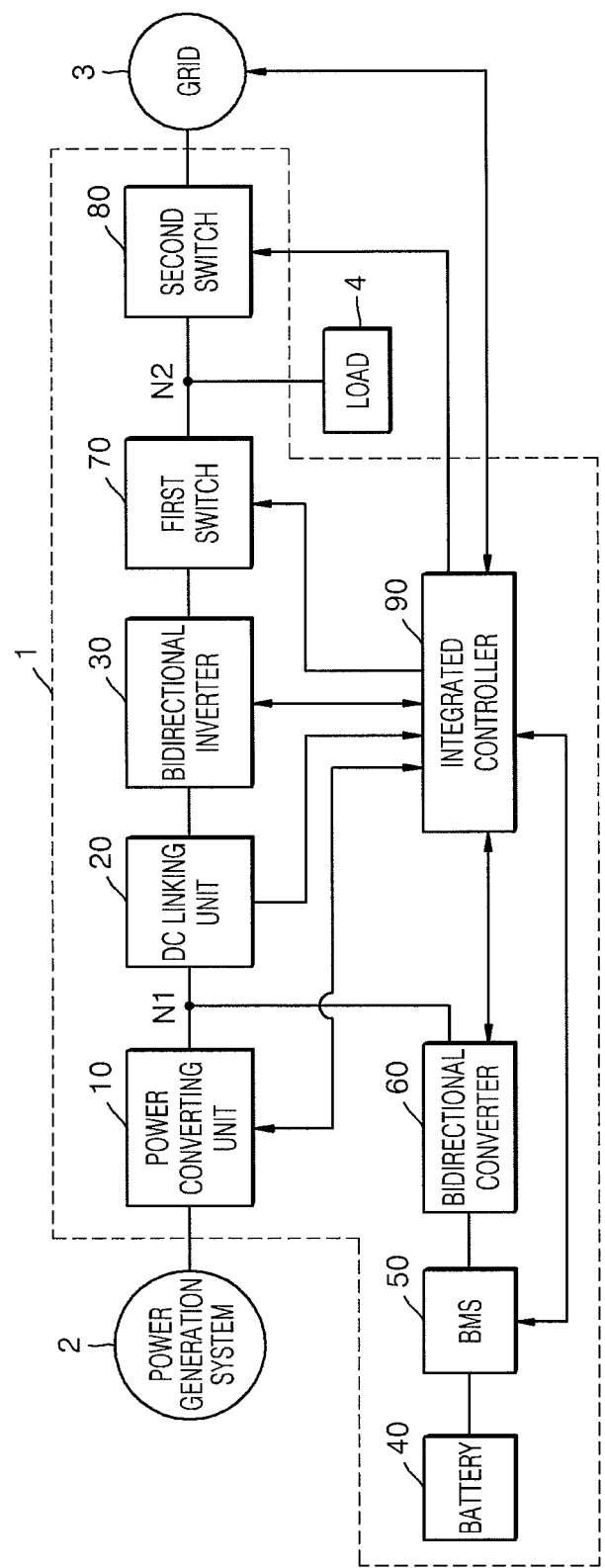
FIG. 1 is a block diagram showing a configuration of an energy storage system according to an embodiment.

As the presented aspects allow for various changes and numerous modifications, only particular embodiments are illustrated in the drawings and described in detail in the written description. However, this is not intended to limit the inventive aspects to particular modes of practice, and it is to be appreciated that all changes, equivalents, and substitutes are encompassed in the present description. In the description, certain detailed explanations of related art are omitted when it is deemed that they may unnecessarily obscure the essence of the inventive aspects.

Energy storage systems and methods of controlling the same according to various embodiments are described below in more detail with reference to the accompanying drawings. Like reference numerals generally refer to the like elements throughout, and some redundant explanations may be omitted.

FIG. 1 is a block diagram showing a configuration of an energy storage system according to an embodiment. Referring to FIG. 1, an energy storage system 1 according to the present embodiment supplies power to a load 4 in cooperation with an power generation system 2 and a grid 3.

The power generation system 2 is a system for generating power by using an energy source. The power generation system 2 supplies generated power to the energy storage system 1. The power generation system 2 may be a solar power generation system, a wind power generation system, a tidal power generation system, or the like, and may be any of other types of power generation systems for generating power by using renewable or non-renewable energies, such as a power generator using solar heat, geothermal heat, or the like. For example, a solar power generator, which generates electric power by using sunlight, may be connected to the energy storage system 1, which may be installed at a house. The power generation system 2 may include a plurality of power generating modules connected in parallel and the power generation system 2 may be a large capacity energy system where each of the plurality of power generating module generates energy.

The grid 3 may include a power plant, a substation, a power line, etc. When the grid 3 is in a normal state, the grid 3 may supply power to the energy storage system 1 or the load 4 or may receive power supplied from the energy storage system 1. When the grid 3 is in an abnormal state, power supply from the grid 3 to the energy storage system 1 or the load 4 stops, and power supply from the energy storage system 1 to the grid 3 also stops.

The load 4 may consume power generated by the power generation system 2, power stored in a battery 40, and power supplied from the grid 3, and may be a house or a factory, for example.

The energy storage system 1 may store power generated by the power generation system 2 in the battery 40 and may transmit generated power to the grid 3. Furthermore, the energy storage system 1 may transmit power stored in the battery 40 to the grid 3 or may store power supplied from the grid 3 in the battery 40. Furthermore, when an abnormality is present (e.g., when power supply from the grid 3 is interrupted), the energy storage system 1 may function as an uninterruptible power supply and supply power to the load 4. Furthermore, when an abnormality is not present, the energy storage system 1 may supply power generated by the power generation system 2 or power stored in the battery 40 to the load 4.

The energy storage system 1 includes a power converting unit (UDC, Uni-directional converter) 10, a direct current (DC) linking unit 20, a bidirectional inverter (INV) 30, the battery 40, a battery management system (BMS) 50, a bidirectional converter (BDC) 60, a first switch 70, a second switch 80, and a integrated controller 90.

The UDC 10 is connected between the power generation system 2 and a first node N1. The UDC 10 converts power generated by the power generation system 2 into DC link voltage and transmits the DC link voltage to the first node N1. In other words, as the UDC 10 operates, power generated by the power generation system 2 is transmitted to the first node N1 to be supplied to the battery 40, the grid 3, and the load 4.

The UDC 10 may include a converter or a rectifying circuit based on the type of the power generation system 2. For example, if the power generation system 2 generates DC power, the UDC 10 may include a converter for converting DC power of the power generation system 2 to DC power with a voltage level for the DC linking unit 20. If, however, the power generation system 2 generates alternating current (AC) power, the UDC 10 may include a rectifying circuit for converting AC power to DC power with the voltage level for the DC linking unit 20. For example, if the power generation system 2 is a solar power generation system, the UDC 10 may include a maximum power point tracking (MPPT) converter. The MPPT converter performs MPPT control in correspondence to variations of isolation and temperature in order to acquire power generated by the power generation system 2 at a peak efficiency.

When the power generation system 2 is not generating power, operation of the UDC 10 may be stopped in order to minimize power consumption.

The DC linking unit 20 is interconnected between the first node N1 and the INV 30 and maintains the DC link voltage of the first node N1 at a constant level. The voltage level of the first node N1 may become unstable due to a momentary voltage drop of the power generation system 2 or the grid 3 or a peak load of the load 4. However, it is desirable to stably maintain the DC link voltage of the first node N1 at a constant level in order for the BDC 60 and the INV 30 to properly operate. The DC linking unit 20 may be used in order to stabilize the DC link voltage level of the first node N1, and may be a capacitor, for example. The capacitor may be an aluminum electrolyte capacitor, a polymer capacitor for high voltages, a multi layer ceramic capacitor (MLCC) for high voltages and large currents, or the like. Although the DC linking unit 20 is embodied as an independent component in the present embodiment, the DC linking unit 20 may be embodied as a part of the BDC 60, the INV 30, or the UDC 10.

The INV 30 is a power inverter interconnected between the DC linking unit 20 and the first switch 70. The INV 30 converts the DC link voltage of the first node N1, which is supplied from the power generation system 2 or the battery 40 in a discharging mode, to an AC voltage for the grid 3 and outputs the converted AC voltage. Furthermore, the INV 30 rectifies an AC voltage of the grid 3 to the DC link voltage of the first node N1 so that power of the grid 3 may be stored in the battery 40 in a charging mode. The INV 30 may include a filter for removing harmonics from the AC voltage output to the grid 3, and may also include a phase locked loop (PLL) circuit for synchronizing a phase of AC voltage output from the INV 30 and a phase of the AC voltage of the grid 3 to suppress generation of reactive power. Furthermore, the INV 30 may perform other functions such as limitation of voltage variation range, power factor correction, direct current component removal, and protection from transient phenomena. When not used, the INV 30 may be stopped to minimize power consumption.

The battery 40 may receive and store power generated by the power generation system 2 and power from the grid 3 and may supply stored power to the load 4 or to the grid 3. The battery 40 may include one or more battery cells, and each battery cell may include a plurality of bare cells. The battery 40 may be formed of any of various types of battery cells and may, for example, be a nickel-cadmium battery, a lead storage battery, a nickel metal hydride (NiMH) battery, a lithium-ion battery, a lithium polymer battery, or the like. A number of batteries 40 may be used and the number may be determined based on power capacity, design conditions, or the like, according to the energy storage system 1. For example, a plurality of batteries 40 may be used when the load 4 consumes a large amount of power. On the contrary, if the load 4 consumes a relatively small amount of power, only one battery 40 may be used.

If surplus power is generated by the power generation system 2 or if power may be received from the grid 3, it may be determined whether to charge the battery 40 based on a state of charge SOC of the battery 40. At this point, the standard for determining whether to charge the battery 40 may differ based on the configuration of the energy storage system 1. For example, if emphasis is laid on UPS functionality, it is important to store as much power as possible in the battery 40, and thus the energy storage system 1 may be configured to always perform a charging operation when the battery 40 is not fully charged. Furthermore, if emphasis is on extension of the lifespan of the battery 40 by reducing the number of times the battery 40 is charged, the energy storage system 1 may be configured to perform a charging operation only when the battery 40 is completely discharged.

The BMS 50 is connected to the battery 40 and controls charging operations and discharging operations of the battery 40 according to controls from the integrated controller 90. To protect the battery 40, the BMS 50 may perform various functions, such as overcharge protection, overdischarge protection, overcurrent protection, overvoltage protection, overheat protection, and cell balancing. To perform such functions, the BMS 50 may monitor any of a voltage, a current, a temperature, a remaining power, a lifespan, and the SOC of the battery 40 and may transmit related information to the integrated controller 90. Although the BMS 50 is separated from the battery 40 in the present embodiment, the BMS 50 and the battery 40 may also be integrated in a single battery pack.

The BDC 60 performs DC-DC conversion on power from the battery 40 in a discharging mode to source power with a voltage level for the INV 30, that is, the DC link voltage. Furthermore, the BDC 60 performs DC-DC conversion on charging power from the first node N1 in a charging mode to generate power with a voltage level for the battery 40, that is, a charging voltage. Here, the charging power is generated by the power generation system 2 or power supplied from the grid 3 via the INV 30. If the BDC 60 is not used, the BDC 60 may be stopped to minimize power consumption.

The first switch 70, a second node N2, and the second switch 80 are connected in series between the INV 30 and the grid 3 and control flow of current between the power generation system 2 and the grid 3 by being turned on or off according to controls of the integrated controller 90. The first switch 70 and the second switch 80 may be turned on or turned off based on states of the power generation system 2, the grid 3, and the battery 40. For example, if the load 4 demands a large amount of power, both the first switch 70 and the second switch 80 may be turned on, so that energy from both the power generation system 2 and the grid 3 may be used. If energy from both the power generation system 2 and the grid 3 are insufficient to satisfy the load 4, power stored in the battery 40 may also be supplied to the load 4. In addition, when power from the grid 3 is interrupted, the second switch 80 is turned off and the first switch 70 is turned on. Therefore, power from the power generation system 2 and/or the battery 40 may be supplied to the load 4. Furthermore, with the second switch off, the load 4 is disconnected from the grid 3, and accidents, such as a worker working on the grid 3 being exposed to power from the energy storage system, may be prevented.

The integrated controller 90 monitors various states of the power generation system 2, the grid 3, the battery 40, and the load 4, and controls the UDC 10, the INV 30, the BMS 50, the BDC 60, the first switch 70, and the second switch 80, based on the various states. The integrated controller 90 may, for example, monitor whether the grid 3 is connected to the load 4 and whether the power generation system 2 is generating power. Furthermore, the integrated controller 90 may monitor an amount of power generated by the power generation system 2, a charge state of the battery 40, an amount of charging power of the battery 40, an amount of power consumed by the load 4, a current time, or the like.

Hereinafter, various modes of the energy storage system 1 controlled by the integrated controller 90 are described.

Operational Modes of the Energy Storage System 1

FIGS. 2 through 8 are concept views showing various modes of the energy storage system shown in FIG. 1.

Figure 2:
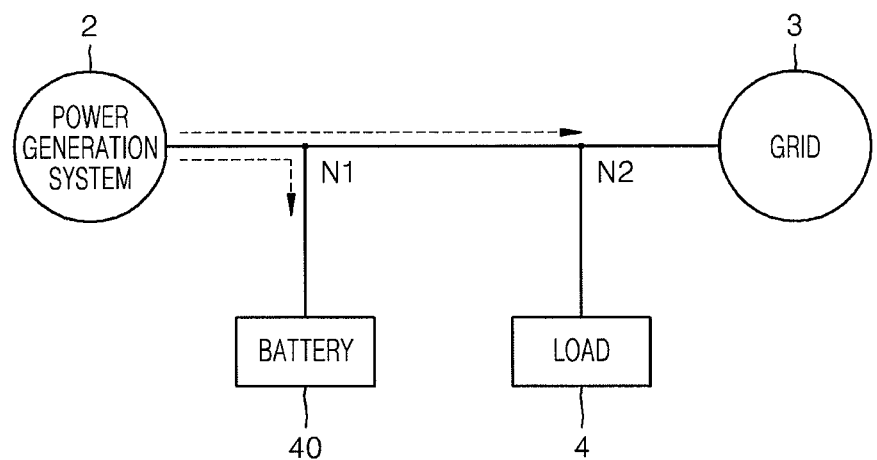
FIGS. 2 through 8 are concept views showing various modes of the energy storage system shown in FIG. 1.

Referring to FIG. 2, a portion of power generated by the power generation system 2 is used to charge the battery 40, and the remaining portion of the power generated by the power generation system 2 is supplied to the load 4 or to the grid 3. In this mode, the UDC 10 performs power conversion, for example, as described above. Furthermore, the BDC 60 operates in a charging mode, whereas the INV 30 operates in a discharging mode. The present mode may be used when the amount of power generated by the power generation system 2 is very large. Furthermore, the present mode may be applied to when it is desired to charge the battery 40.

In the mode of FIG. 2, power generated by the power generation system 2 may be distributed based on the charge state of the battery 40 and power supply required by the load 4.

If priority is given to charging the battery 40, a portion of power generated by the power generation system 2 that is needed to charge the battery 40 is supplied to the battery 40, and the remaining portion of the power generated by the power generation system 2 is supplied to the grid 3 or the load 4. For example, if the grid 3 is connected to the load 4, the grid 3 may supply any power to the load 4 still lacking despite the load 4 receiving power from the power generation system 2. Accordingly, in this mode, priority is given to charging the battery 40.

If priority is given to sourcing power for the load 4, power generated by the power generation system 2 is supplied to the load 4, and any remaining portion from the power generation system 2 is used to charge the battery 40. For example, if the grid 3 is not connected to the load 4, power generated by the power generation system 2 is supplied to the load 4, and only excess power from the power generation system 2 is used to charge the battery 40.

Figure 3:
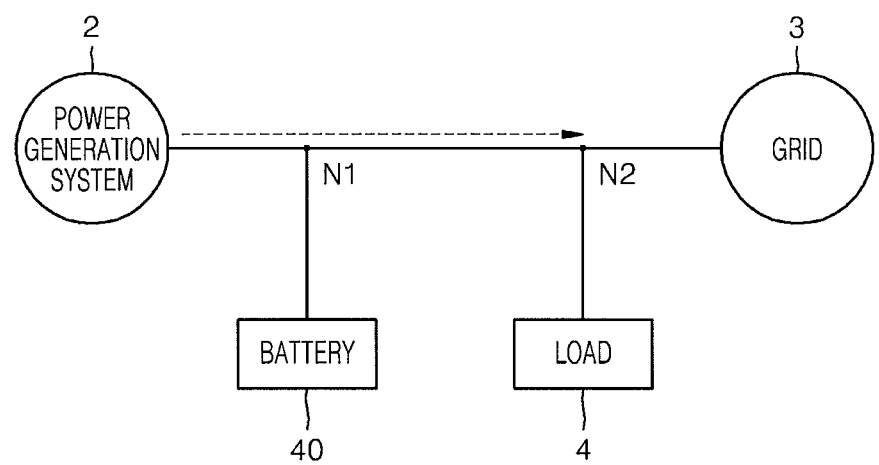

Referring to FIG. 3, all power generated by the power generation system 2 is supplied to the load 4. Here, the UDC 10 performs power conversion. Furthermore, the BDC 60 stops operating, and the INV 30 operates in a discharging mode. In this mode, since power generated by the power generation system 2 is only supplied to the grid 3 or the load 4, the UDC 10 may operate in a MPPT control mode for generating power at a peak efficiency. This mode may be applied based on whether it is necessary to charge the battery 40 and whether the amount of power generated by the power generation system 2 is greater than the amount of power consumed by the load 4.

Figure 4:
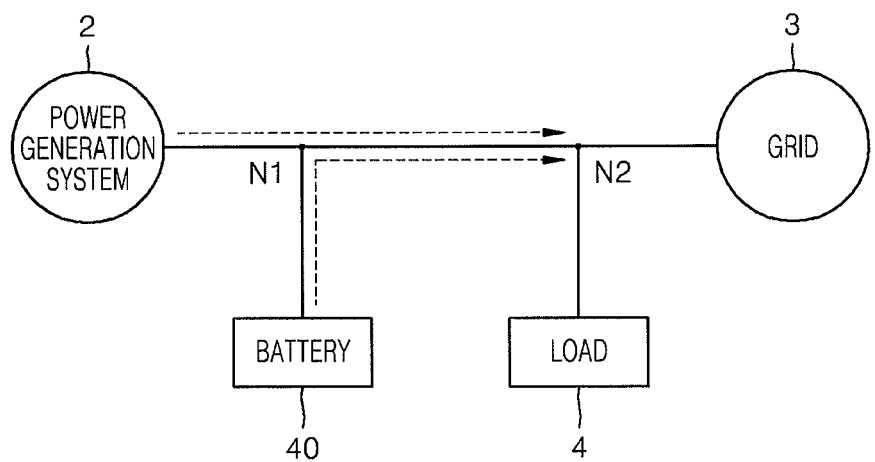

Referring to FIG. 4, in the mode of FIG. 4, power generated by the power generation system 2 and power stored in the battery 40 are supplied to the grid 3 or the load 4 at the same time. In this mode, the UDC 10 performs power conversion. Furthermore, the INV 30 and the BDC 60 both operate in their respective discharging modes. The present mode may be applied, for example, when the battery 40 may discharge power and the amount of power consumed by the load 4 is greater than the amount of power generated by the power generation system 2. If power supplied from the power generation system 2 and the battery 40 are insufficient to satisfy the load 4, power of the grid 3 may be additionally supplied to the load 4. Alternatively, even if power supplied from the grid 3 by itself is sufficient to satisfy the load 4, when the cost of the power supplied from the grid 3 is greater than the cost of the power supplied from the energy storage system, power from the power generation system 2 and the battery 40 may be supplied to the load 4.

Figure 5:
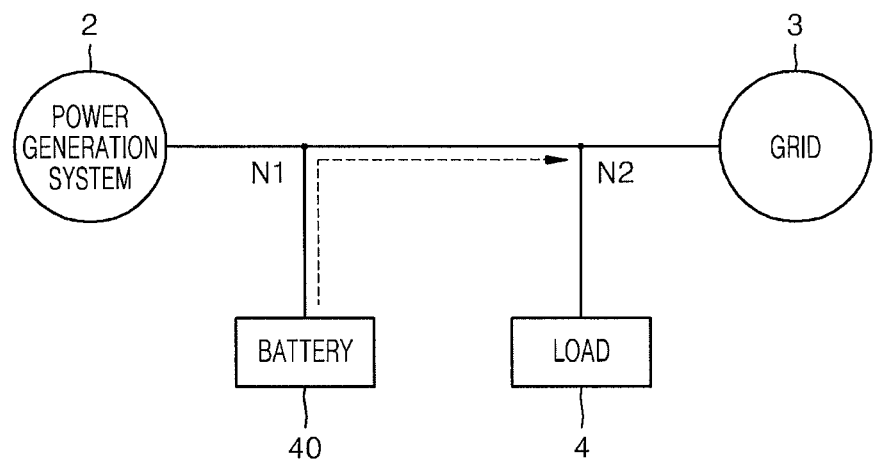

Referring to FIG. 5, only power stored in the battery 40 is supplied to the grid 3 and the load 4. In this case, the power generation system 2 does not generate power, e.g., at night when the power generation system 2 is a solar power generation system. Since no power is generated by the power generation system 2, the UDC 10 stops operating. The INV 30 and the BDC 60 operate in their respective discharging modes. When the load 4 is not connected to the grid 3, if the amount of power discharged from the battery 40 is greater than the amount of power consumed by the load 4, and if the battery 40 may be discharged, the present mode may be applied. Furthermore, even if the load 4 is connected to the grid 3, the mode of FIG. 3 may be applied, for example, if the amount of power consumed by the load 4 is greater than that available from the grid 3. Furthermore, this mode may be applied to reduce costs by using power stored in the battery 40 during a time when the cost of power from the grid is high.

Figure 6:
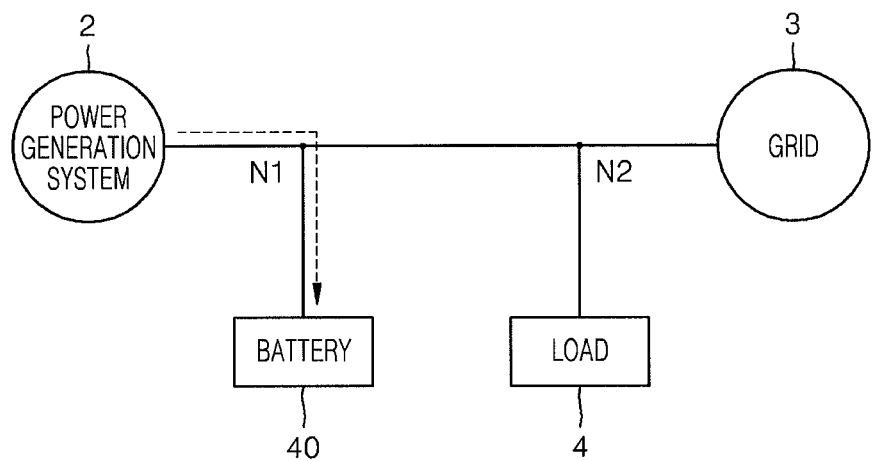

Referring to FIG. 6, all of the power generated by the power generation system 2 is supplied to the battery 40. Here, the UDC 10 performs power conversion. Furthermore, the INV 30 stops operating, and the BDC 60 operates in a charging mode. The present mode may, for example, be applied when the battery 40 may no longer be discharged.

Figure 7:
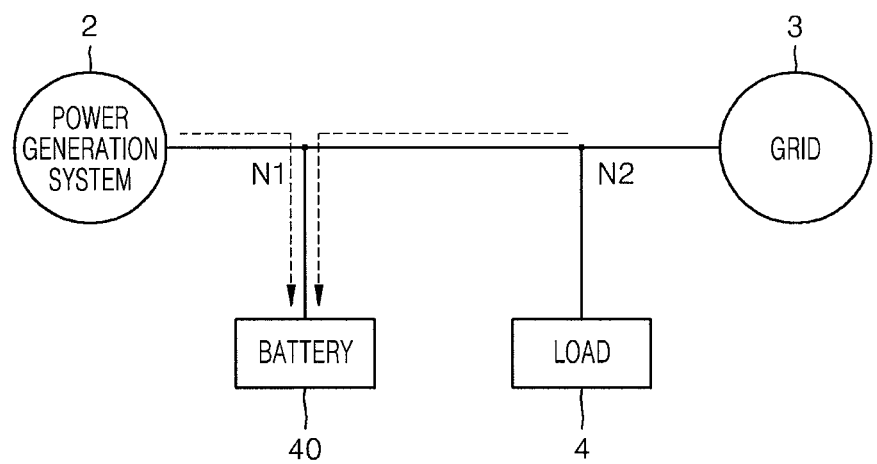

Referring to FIG. 7, the battery 40 is charged by power generated by the power generation system 2 and by power of the grid 3. In this mode, the UDC 10 performs power conversion. Furthermore, the INV 30 and the BDC 60 operate in their respective charging modes. In this mode, the grid 3 and the load 4 are connected, and this mode may be applied when the amount of power generated by the power generation system 2 is less than the amount of power to be charged in the battery 40.

Figure 8:
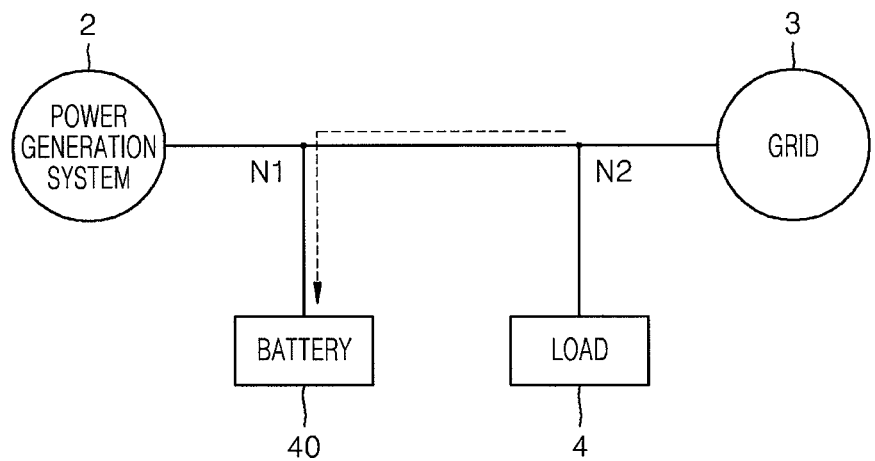

Referring to FIG. 8, the battery 40 is with power from the grid 3. In this case, the power generation system 2 may not generate power at all. Since no power is generated by the power generation system 2, the UDC 10 stops operating. The INV 30 and the BDC 60 operate in their respective charging modes. Since power is received from the grid 3 in this mode, the grid 3 and the load 4 are connected, and this mode may be applied when the battery 40 may be charged.

Although not shown, if the power generation system 2 does not supply power or the battery 40 is neither being charged nor discharged, the energy storage system 1 may completely stop operations of the UDC 10, the INV 30, and the BDC 60 to minimized power consumption. However, in some embodiments, the energy storage system 1 continues to monitor the states of the power generation system 2, the grid 3, and the load 4.

The energy storage system 1 may have various modes as described above. Hereinafter, a method of determining a mode for operation based on various conditions will be described.

Method of Controlling Energy Storage System

Figure 9:
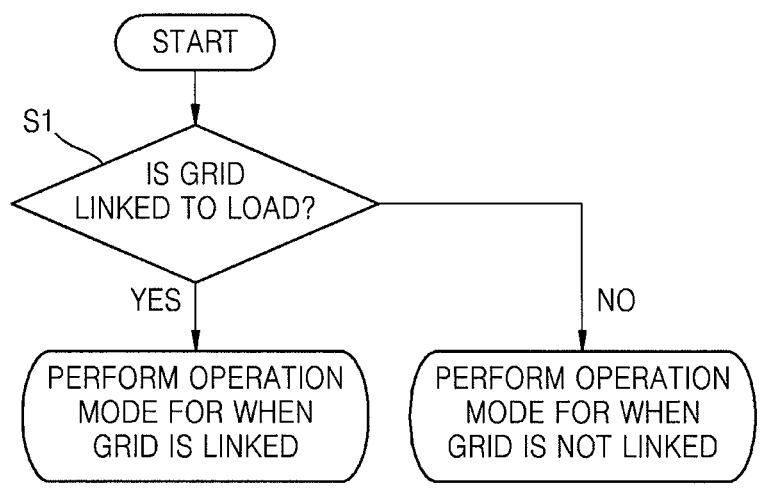
FIGS. 9 through 11 are flowcharts showing a method of controlling an energy storage system, according to an embodiment.
Figure 10:
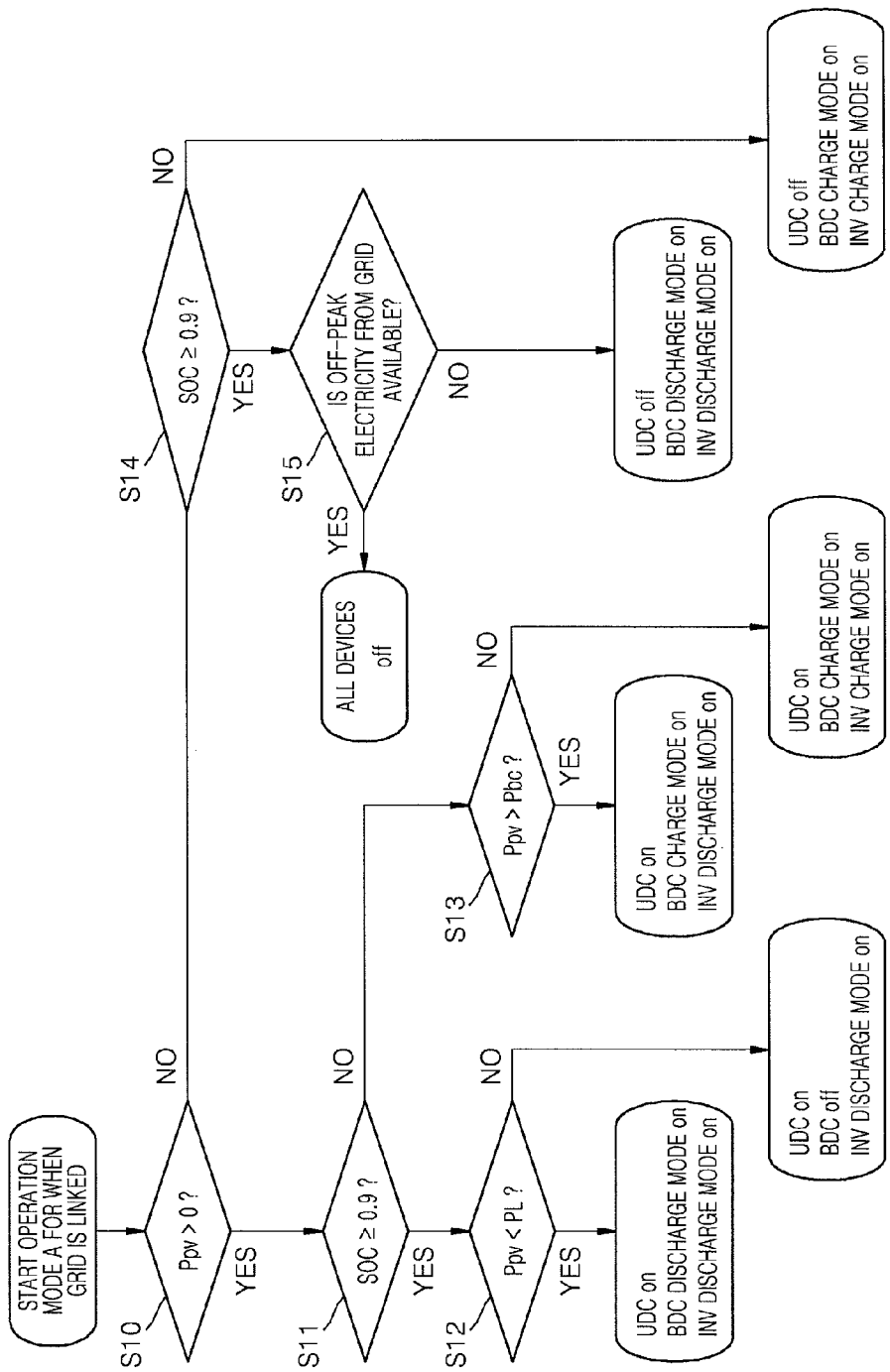
Figure 11:
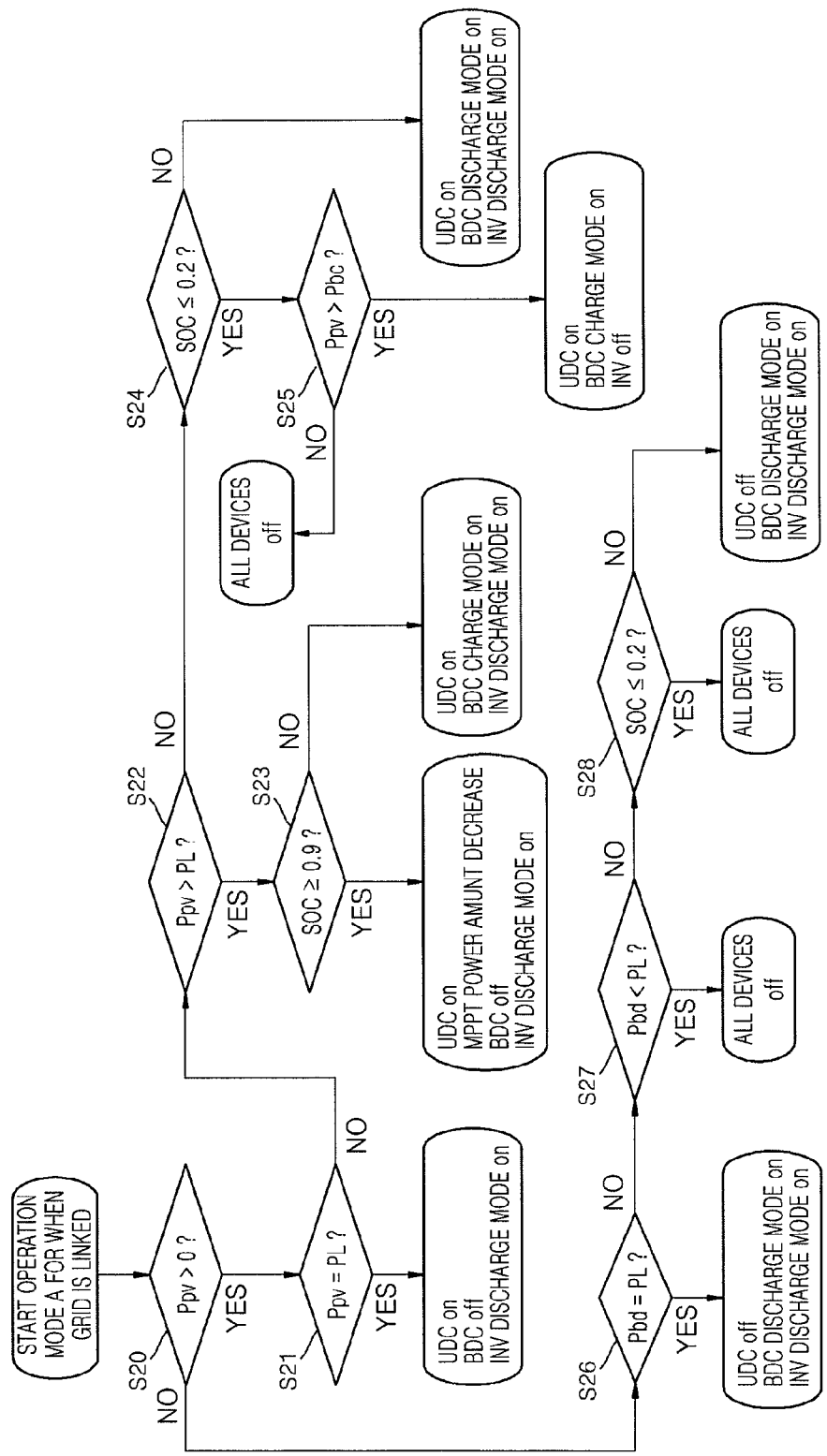

FIGS. 9 through 11 are flowcharts showing a method of controlling an energy storage system, according to some embodiments.

Referring to FIG. 9, the energy storage system 1 determines whether the load 4 is connected to the grid 3.

When the load 4 is connected to the grid 3, power may be supplied to the load 4 from the grid. Therefore, the energy storage system 1 may prioritize charging the battery 40. In some embodiments, the battery 40 may be used to perform a UPS function.

However, the load 4 may not be connected to the grid 3, such as when any of various abnormalities, such as a power interruption, occurs. In is then advantageous to control the energy storage system 1 to supply power to the load 4. Therefore, the energy storage system 1 may be controlled with priority given to supplying power to the load 4.

Based on whether the load 4 is connected to the grid 3, the integrated controller 90 controls the energy storage system 1 to be in a mode for when the grid 3 and the load 4 are connected or to be in a mode for when the grid 3 and the load 4 are not connected.

FIG. 10 is a flowchart showing a mode for when the grid 3 and the load 4 are connected.

Referring to FIG. 10, whether power is generated by the power generation system 2 is determined (operation S10). If power is generated by the power generation system 2, the charge state of the battery 40 is determined. For example, whether the charge state of the battery 40 is above a reference value, about 0.9 is determined. (operation S11). The charge state of about 0.9 is a reference value indicating that the battery 40 is fully charged. However, the value is merely an example, and the present invention is not limited thereto.

In this embodiment, if the charge state of the battery 40 is above about 0.9, an amount of power Ppv generated by the power generation system 2 and an amount of power PL to be consumed by the load 4 are compared (operation S12). If PL is greater than Ppv, all power generated by the power generation system 2 is supplied to the load 4, the UDC 10 is turned on, and the BDC 60 and the INV 30 are set to operate in discharging modes. In addition, since the amount of power Ppv generated by the power generation system 2 is insufficient to satisfy the power PL to be consumed by the load 4, power of the grid 3 or power stored in the battery 40 may also be supplied to the load 4. If, however, PL is less than Ppv, all power supplied to the load 4 may be generated by the power generation system 2. Accordingly, the UDC 10 is turned on, and the INV 30 is set to operate in a discharging mode. Furthermore, the BDC 60 is not needed and is turned off.

If the charge state of the battery 40 is less than about 0.9, the BDC 60 is set to operate in a charging mode and the battery 40 is charged. In addition, whether Ppv is greater than the charging power of the battery 40 Pbc is determined (operation S13). If Ppv is greater than Pbc, only a portion of power generated by the power generation system 2 necessary to charge the battery 40 is supplied to the battery 40, and the remaining portion of the power generated by the power generation system 2 is supplied to the load 4. In this case, the UDC 10 is turned on, and the INV 30 is set to operate in a discharging mode. On the contrary, if Ppv is less than Pbc, power generated by the power generation system 2 is insufficient to charge the battery 40. Therefore, the INV 30 is set to operate in a charging mode, and the battery 40 is charged by using power from both the power generation system 2 and the grid 3.

If it is determined in operation S10 that no power is generated by the power generation system 2, the UDC 10 is turned off, and the charge state of the battery 40 is determined (operation S14). If the battery 40 is fully charged, a cost comparison is performed (operation S15). If the cost of the grid power Cgp is less than the cost of the energy storage system power Cessp, power from the grid 3 is used. In some embodiments, to compare the costs, the current time is determined. Cost of power supplied from the grid 3 may vary according to time of day. For example, the cost of off-peak electricity may be relatively inexpensive. Accordingly, operation S15 may be used to determine whether off-peak electricity from the grid 3 is available and less expensive than power from the energy storage system 1. When off-peak electricity from the grid 3 is available and less expensive, the load 4 uses power supplied from the grid 3, and thus components of the energy storage system 1 are turned off. However, as described above, in some embodiments, the integrated controller 90 continues monitoring operation. If however, power from the grid 3 is not less expensive than power from the energy storage system 1, power stored in the battery 40 is supplied to the load 4, and the BDC 60 and the INV 30 are set to operate in their respective discharging modes.

If it is determined in operation S14 that the charge state of the battery 40 is less than about 0.9, that is, the battery 40 is not fully charged, the battery 40 is charged by receiving power from the grid 3. To charge the battery 40, the BDC 60 and the INV 30 are set to operate in their respective charging modes.

FIG. 11 is a flowchart showing a method for controlling the energy storage system 1 if the grid 3 and the load 4 are not connected.

Referring to FIG. 11, whether power is generated by the power generation system 2 is determined (operation S20). If power is generated by the power generation system 2, the amount of power Ppv generated by the power generation system 2 is compared with the amount of power PL needed by the load 4 (operations S21 and S22).

If Ppv is the same as PL, power generated by the power generation system 2 may satisfy the requirements of the load 4. Therefore, the UDC 10 is turned on, the NV 30 is set to operate in a discharge mode, and power generated by the power generation system 2 is supplied to the load 4. Since power stored in the battery 40 is not used, the BDC 60 is turned off.

If Ppv is greater than PL, the charge state of the battery 40 is determined (operation S23). If the charge state of the battery 40 is above 0.9, the UDC 10 is turned on, the INV 30 is set to operate in a discharging mode, and power generated by the power generation system 2 is supplied to the load 4. Since power stored in the battery 40 is not used, the BDC 60 is turned off. Because the load 4 and the grid 3 are not connected, and Ppv is greater than PL, surplus power is generated. Therefore, the UDC 10 stops performing an MPPT control operation and reduces the amount of power Ppv generated by the power generation system 2, such that the amount of power Ppv generated by the power generation system 2 corresponds to amount of power PL consumed by the load 4.

If, however, in operation S23, the charge state of the battery 40 is less than 0.9, it is beneficial to charge the battery 40. The UDC is turned on, the BDC 60 is set to operate in a charging mode, and the INV 30 is set to operate in a discharging mode. Since supplying power to the load 4 has priority, the power generated by the power generation system 2 corresponding to the amount of power PL consumed by the load 4 is supplied to the load 4, and the remaining portion of the power generated by the power generation system 2 is supplied to the battery 40.

If, in operation S22, Ppv is less than PL, whether the charge state of the battery 40 is less than about 0.2 is determined (operation S24). A charge state of 0.2 is a reference value indicating that the battery 40 is fully discharged. However, the value is merely an example, and the present invention is not limited thereto. If the charge state of the battery 40 is less than about 0.2, the amount of power Ppv generated by the power generation system 2 and an amount of power Pbc needed to charge the battery 40 are compared (operation S25). IF Ppv is greater than Pbc, the battery 40 is charged by using power generated by the power generation system 2. Therefore, the UDC 10 is turned on, and the BDC 60 is set to operate in a charging mode, and the INV 30 is turned off. However, if, in operation S25, Ppv is less than Pbc, power generated by the power generation system 2 is insufficient to supply the load 4 and to charge the battery 40, and all components of the energy storage system 1 are turned off.

If, however, in operation S20, no power is generated by the power generation system 2, the UDC 10 is turned off, and the power Pbd discharged from the battery 40 is compared to the power PL to be consumed by the load 4 (operations S26 and S27). If Pbd is the same as PL, power stored in the battery 40 is supplied to the load 4. Therefore, the BDC 60 and the INV 30 are set to operate in discharging modes.

If Pbd is less than PL, power stored in the battery 40 is insufficient to satisfy the load 4, and all components of the energy storage system 1 are turned off.

If Pbd is greater than PL, the charge state of the battery 40 is determined (operation S28), and, if the charge state of the battery 40 is below 0.2, all components of the energy storage system 1 are turned off. If, however, the charge state of the battery 40 is above 0.2, power stored in the battery 40 is supplied to the load 4. Accordingly, the BDC 60 and the INV 30 are set to operate in their respective discharging modes.

According to the method of FIG. 11, the energy storage system 1 may operate in an optimal state based on the states of the power generation system 2, the load 4, and the grid 3.

Figure 12:
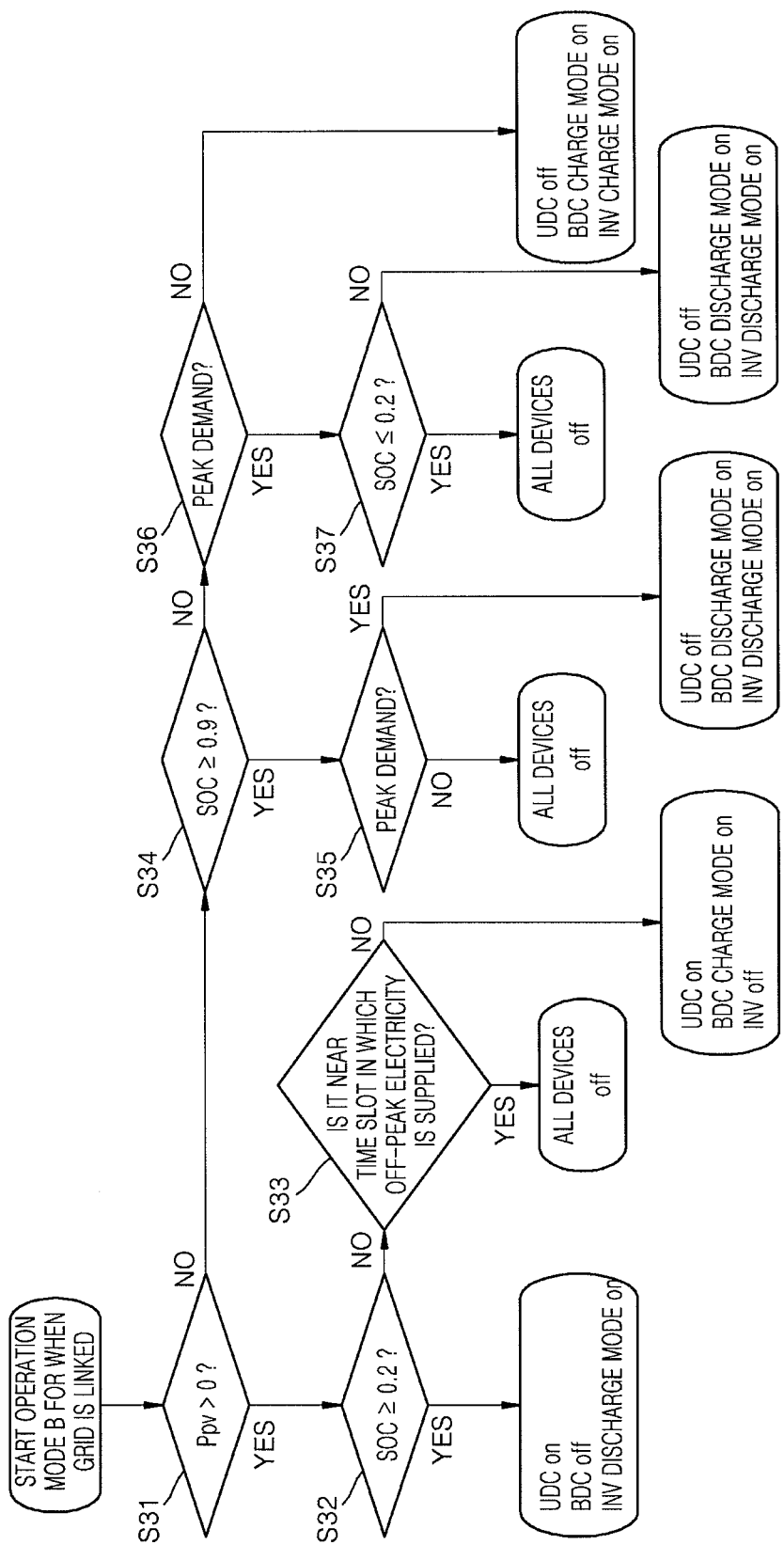
FIGS. 12 and 13 are flowcharts showing a method of controlling an energy storage system, according to another embodiment.
Figure 13:
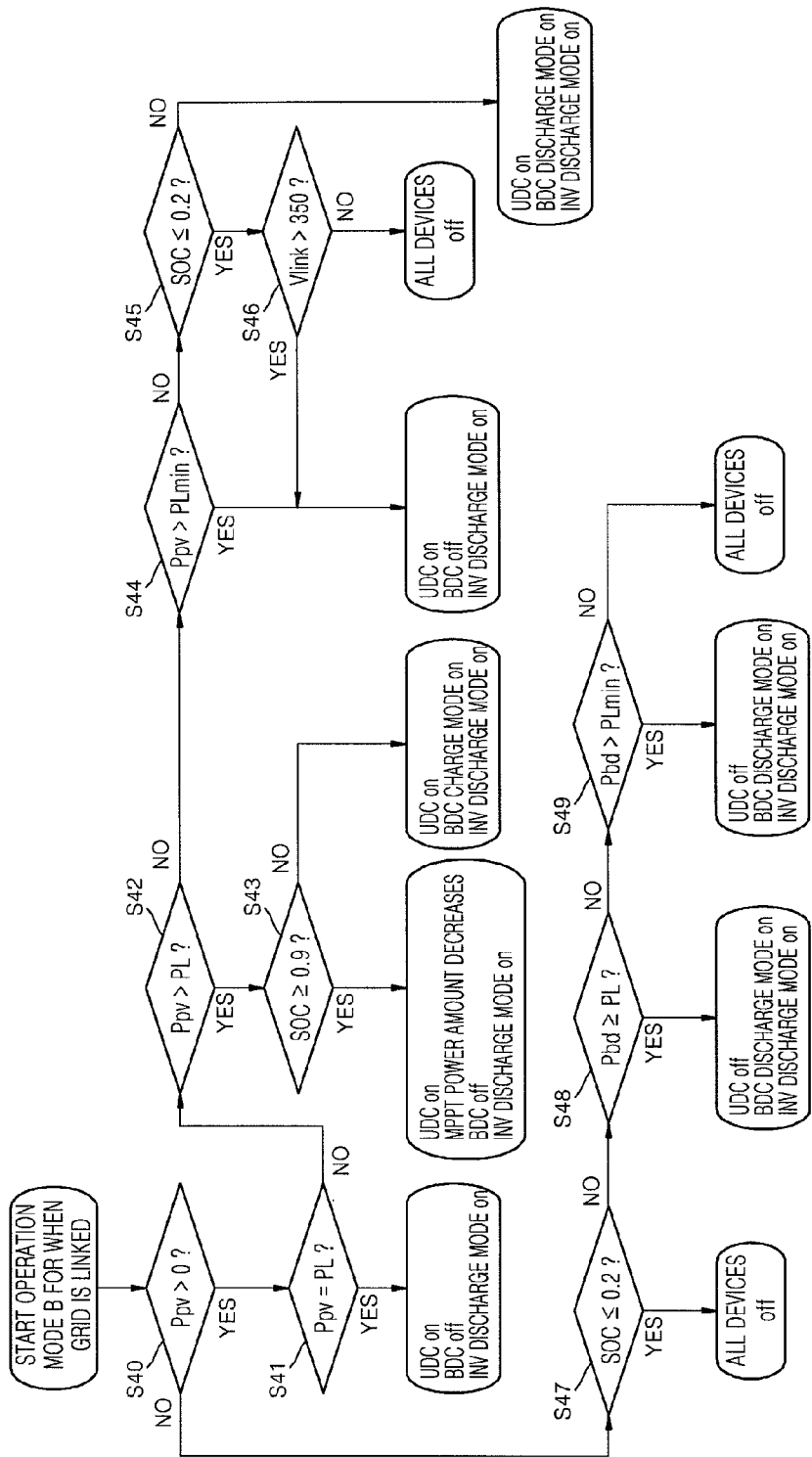

FIGS. 12 and 13 are flowcharts showing methods of controlling an energy storage system, according to other embodiments. of the present invention.

FIG. 12 is a flowchart showing a mode for when the grid 3 and the load 4 are connected. Referring to FIG. 12, whether power is generated by the power generation system 2 is determined (operation S31). If power is generated by the power generation system 2, the charge state of the battery 40 is determined (operation S32). In operation 32, it is determined whether the charge state of the battery 40 is above a reference value indicating whether the battery 40 is fully discharged (operation S32). If the charge state of the battery 40 is above the reference value, the battery 40 is not charged even if the battery 40 is not fully charged. The priority may be to extend the lifespan of the battery 40 by reducing the amount of charging and discharging in the battery 40. In this case, all power generated by the power generation system 2 is supplied to the grid 3 and the load 4. The UDC 10 is turned on, the INV 30 is set to operate in a discharging mode, and the BDC 60 is turned off.

If, in operation S32, the charge state of the battery 40 is less than the reference value indicating that the battery 40 is fully discharged, the battery 40 should be charged. The current cost of grid power can be compared to the cost of power from the power generation system. For example, the current time may be determined to determine whether the current time is at or near a time when off-peak electricity is available (operation S33). When the current time is at or near a time when off-peak electricity is available, e.g., within 30 minutes, all components of the energy storage system 1 are turned off until the current time is within the time when the off-peak electricity is supplied. However, if, in operation S33 the time when off-peak electricity is supplied is not near, the battery 40 is charged by receiving power generated by the power generation system 2. Accordingly, the UDC 10 is turned on, the BDC 60 is set to operate in a charging mode, and the INV 30 is turned off.

If it is determined in operation S31 that no power is generated by the power generation system 2, the UDC 10 is turned off. In addition, the charge state of the battery 40 is determined (operation S34). If the charge state of the battery 40 is above the reference value indicating that the battery 40 is fully charged, the power needed by the load 4 PL is compared to the power available from the grid 3 PG (operation S35). If power supplied from the grid 3 is greater than the amount of power PL to be consumed by the load 4, all components of the energy storage system 1 are turned off. However, in the case that power supplied from the grid 3 does not satisfy the amount of power PL to be consumed by the load 4, power stored in the battery 40 is supplied to the load 4, and the BDC 60 and the INV 30 are set to operate in discharging modes. In some embodiments, determining whether the power supplied from the grid 3 is greater than the amount of power PL to be consumed by the load 4 includes determining a current time and comparing the time with known times when the load 4 is expected to operate with peak demand or with power consumption greater than that available from the grid 3.

If in the operation S34 the charge state of the battery 40 is less than the reference value, the power needed by the load 4 PL is compared to the power available from the grid 3 PG (operation S36). If the power needed by the load 4 is not greater than the power available from the grid 3, the battery 40 is charged with power from the grid 3. The INV 30 and the BDC 60 are set to operate in their respective charging modes. However, if in operation S36 the power needed by the load 4 is greater than the power available from the grid 3, it is determined whether the charge state of the battery 40 is below the reference value indicating that the battery 40 is fully discharged (operation S37). If the charge state of the battery 40 is below the reference value indicating that the battery 40 is fully discharged, power is not be supplied from the grid 3, and all components of the energy storage system 1 are turned off. If, however, in operation S37, the charge state of the battery 40 is greater than the reference value, the battery 40 may be discharged. Accordingly, since power supplied from the grid 3 does not satisfy the amount of power PL to be consumed by the load 4, power stored in the battery 40 is supplied to the load 4. At this point, the BDC 60 and the INV 30 are set to operate in their respective discharging modes.

FIG. 13 is a flowchart showing an operation mode for when the grid 3 and the load 4 are not connected.

Referring to FIG. 13, whether power is generated by the power generation system 2 is determined (operation S40). If power is generated by the power generation system 2, the energy storage system 1 may operate according to operations S41 through S43. Operations S41 through S43 are the same as operations S21 through S23 of FIG. 11, and thus detailed descriptions thereof are omitted.

If in operation S42, Ppv is below PL, Ppv is compared with a minimum amount PLmin of power to be consumed by the load 4. If Ppv is greater than PLmin, power generated by the power generation system 2 is supplied to the load 4 so as to supply the minimum amount of power to the load 4. Accordingly, the UDC 10 is turned on, the INV 30 is set to operate in a discharging mode, and the BDC 60 is turned off. If Ppv is below PLmin, the charge state of the battery 40 is determined (operation S45). If the charge state of the battery 40 is greater than a reference value indicating that the battery 40 is fully discharged, power generated by the power generation system 2 and power stored in the battery 40 are supplied to the load 4. To accomplish this, the UDC 10 is turned on, and the BDC 60 and the INV 30 are set to operate in discharging modes.

If, however, the charge state of the battery 40 is less than the reference value, a DC link voltage Vlink is measured and compared to a reference voltage (operation S46). The DC link voltage Vlink may decrease when the amount of power PL to be consumed by the load 4 is greater than that which is supplied from the energy storage system 1 to the load 4. In other words, the states of the power generation system 2, the grid 3, the load 4, and the battery 40 may be anticipated based on the DC link voltage Vlink. The reference voltage may be less than the DC link voltage at its proper functioning value. For example, if it is expected that the normal DC link voltage Vlink is 370V, the reference voltage may be 350V. If it is determined in operation S46 that the DC link voltage Vlink is below 350V, all components of the energy storage system 1 are turned off. If, however, it is determined in operation S46 that the DC link voltage is greater than 350V, power generated by the power generation system 2 is supplied to the load 4. To do this, the UDC 10 is turned on, the INV 30 is set to operate in a discharging mode, and the BDC 60 is turned off.

If it is determined in operation S40 that no power is generated by the power generation system 2, the UDC 10 is turned off. The charge state of the battery 40 is determined (operations S47), and if the charge state of the battery 40 is below a reference value indicating that the battery 40 is fully discharged, all components of the energy storage system 1 are turned off.

If the charge state of the battery 40 is greater than the reference value, an amount of power Pbd discharged from the battery 40 and the amount of power PL to be consumed by the load 4 are compared (operation S48). If Pbd is less than PL, the amount of power Pbd discharged from the battery 40 and the minimum amount of power PLmin to be consumed by the load 4 are compared (operation S49). If Pbd is greater than or equal to PL, or if Pbd is greater than or equal to PLmin, power stored in the battery 40 is supplied to the load 4. To accomplish this, the BDC 60 and the INV 30 are set to operate in their respective discharging modes. If Pb is less than PLmin, power stored in the battery 40 is insufficient to satisfy the minimum amount of power PLmin to be consumed by the load 4, and all components of the energy storage system 1 are turned off.

According to the method as described above, the energy storage system 1 according to the present embodiment may operate in an optimal state based on the states of the power generation system 2, the load 4, and the grid 3

A computer program for implementing the above embodiments and modified embodiments may be recorded on a computer readable recording medium. The computer readable recording medium may be any data storage device that can store programs or data which can be thereafter read by a processor. Examples of the computer readable recording medium include semiconductor recording medium (e.g. flash memory), magnetic recording medium (e.g. ROM), hard disks, and so on. The recording medium may be read by a processor, e.g. the integrated controller 90 as shown in FIG. 1, and the computer program may be executed by the processor.

It should be understood that the exemplary embodiments described herein should be considered in a descriptive sense only and not for purposes of limitation. Descriptions of features or aspects within each embodiment should typically be considered as available for combination with other features or aspects in other embodiments.

What is claimed is:
1. A method of controlling an energy storage system connected to a power generation system, a battery, a grid, and a load, the method comprising:
 determining whether the grid is connected to the load; and
 determining whether power is generated by the power generation system,
 wherein the energy storage system operates in one of a plurality of modes, based on at least one of the amount of power generated by the power generation system, the charge state of the battery, the amount of power needed to charge the battery, the amount of power discharged from the battery, the amount of power to be consumed by the load, the current time, whether the grid is connected to the load, and whether power is generated by the power generation system,
 wherein an operating mode of the energy storage system is determined based at least in part on whether the current time corresponds to a time when the load is expected to operate with a predetermined demand,
 wherein, if the grid is connected to the load, no power is generated by the power generation system, and the charge state of the battery is greater than a reference value indicating that the battery is fully charged, the mode of the energy storage system is determined based on whether the current time corresponds to a time when the load is expected to consume an amount of power greater than that provided by the energy storage system, and wherein, if the grid is connected to the load, no power is generated by the power generation system, and the charge state of the battery is less than a reference value indicating that the battery is fully charged, the mode of the energy storage system is determined based on whether the current time corresponds to a time when the load is expected to consume an amount of power greater than that provided by the energy storage system and whether the charge state of the battery is less than a reference value indicating that the battery is fully discharged.

2. The method of claim 1, wherein, if the grid is connected to the load, power is generated by the power generation system, and the charge state of the battery is greater than a reference value indicating that the battery is fully charged, the mode of the energy storage system is determined by comparing the amount of power generated by the power generation system and the amount of power to be consumed by the load.

3. The method of claim 1, wherein, if the grid is connected to the load, power is generated by the power generation system, and the charge state of the battery is less than a reference value indicating that the battery is fully charged, the mode of the energy storage system is determined by comparing the amount of power generated by the power generation system and the amount of power needed to charge the battery.

4. The method of claim 1, wherein, if the grid is connected to the load and power is generated by the power generation system, the mode of the energy storage system is determined based on the charge state of the battery and the current time.

5. The method of claim 1, wherein, if the grid is connected to the load and no power is generated by the power generation system, the mode of the energy storage system is determined based on the charge state of the battery and the current time.

6. The method of claim 1, wherein, if the grid is not connected to the load and power is generated by the power generation system, the mode of the energy storage system is determined based on the amount of power generated by the power generation system and the amount of power to be consumed by the load.

7. The method of claim 6, wherein, if the amount of power generated by the power generation system is greater than the amount of power to be consumed by the load, the mode of the energy storage system is determined based on the charge state of the battery.

8. The method of claim 6, wherein, if the amount of power generated by the power generation system is less than the amount of power to be consumed by the load, the mode of the energy storage system is determined by comparing the amount of power generated by the power generation system and the amount of power needed to charge the battery.

9. The method of claim 6, wherein, if the amount of power generated by the power generation system is less than the amount of power to be consumed by the load, the mode of the energy storage system is determined based on the amount of power generated by the power generation system, a minimum amount of power to be consumed by the load, and the charge state of the battery.

10. The method of claim 9, wherein, if the amount of power generated by the power generation system is less than the minimum amount of power to be consumed by the load and the charge state of the battery is below a reference value indicating that the battery is fully charged, the mode of the energy storage system is determined based on the magnitude of a direct current (DC) link voltage.

11. The method of claim 1, wherein, if the grid is not connected to the load and no power is generated by the power generation system, the mode of the energy storage system is determined based on the amount of power discharged from the battery and the amount of power to be consumed by the load.

12. The method of claim 11, wherein, if the amount of power discharged from the battery is greater than the amount of power to be consumed by the load, the mode of the energy storage system is determined based on the charge state of the battery.

13. The method of claim 1, wherein, if the grid is not connected to the load and no power is generated by the power generation system, the mode of the energy storage system is determined based on the charge state of the battery.

14. The method of claim 13, wherein, if the charge state of the battery exceeds a reference value indicating that the battery is fully discharged, the mode of the energy storage system is determined based on whether the amount of power discharged from the battery is greater than the amount of power to be consumed by the load.

15. The method of claim 14, wherein, if the amount of power discharged from the battery is less than the amount of power to be consumed by the load, the mode of the energy storage system is determined based on the minimum amount of power to be consumed by the load.

* * * * *